Aug. 23, 1966   M. LEICHSENRING   3,268,027
AUTOMOTIVE VEHICLE SPEED INDICATING MEANS
Filed Feb. 23, 1965
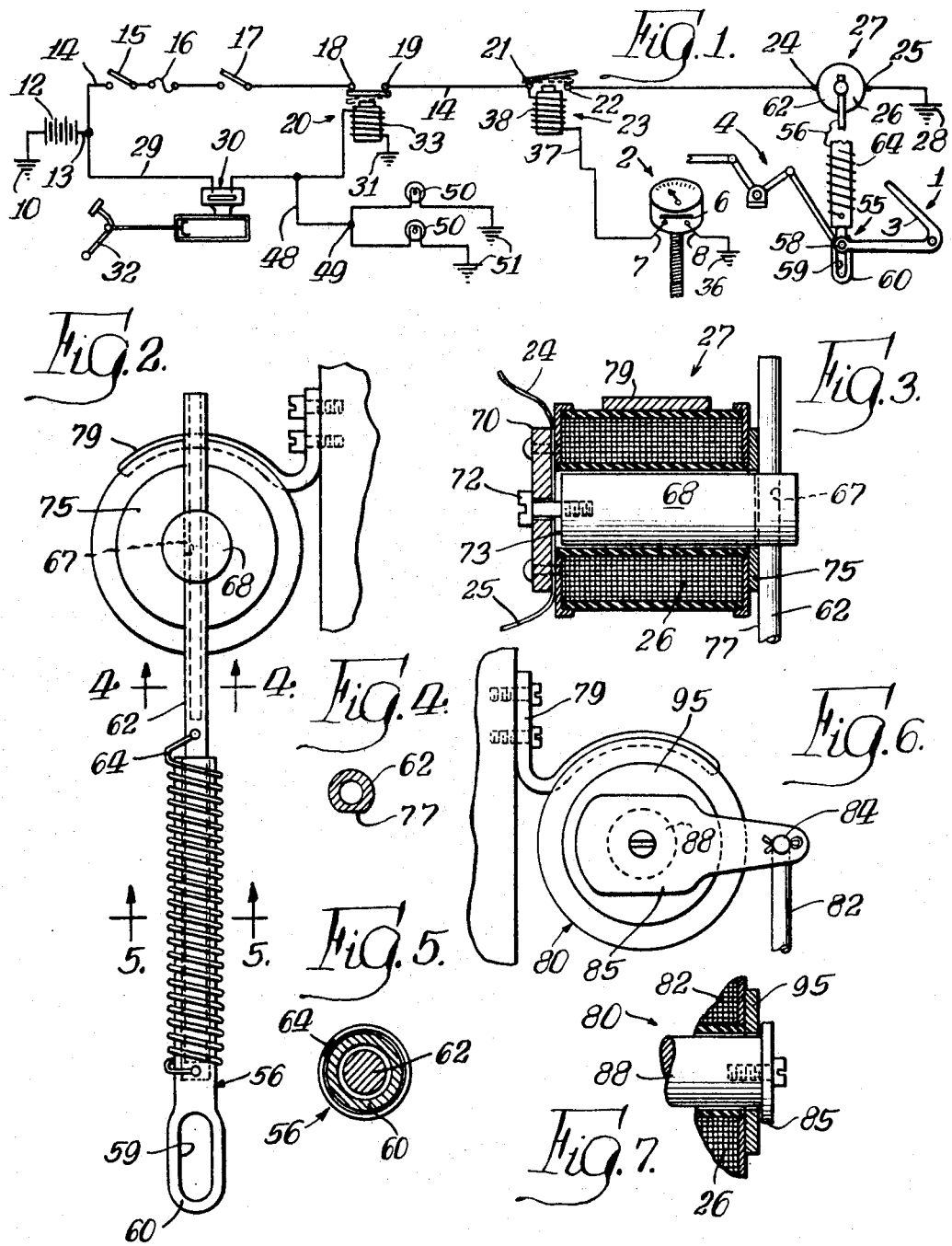
Inventor:-
Max Leichsenring
By Brown, Jackson, Boettcher & Dienner
Attys United States Patent Office 3,268,027
Patented August 23, 1966

3,268,027
AUTOMOTIVE VEHICLE SPEED
INDICATING MEANS
Max Leichsenring, 4525 N. Francisco St., Chicago, Ill.
Filed Feb. 23, 1965, Ser. No. 434,485
13 Claims. (Cl. 180—82.1)

The present invention relates to automotive vehicle speed indicating means operable to indicate to an operator of a vehicle when a preselected predetermined speed of operation of the vehicle has been reached or is being exceeded.

In the art to which this invention relates, speedometer powered motion controlled switches are known. Such switches are manually settable to any given selected predetermined speed at which it is desired to give a signal or effect operation of various means to alert or indicate to the vehicle operator when the selected speed is reached or is being exceeded. Also, it is known to embody such speedometer motor controlled switches together with an actuating member of vehicle power regulating means for a vehicle, such as an accelerator pedal, having connection with a carburetor of the vehicle to modify the force for moving the actuator member so that the operator by sense of feel is alerted that the selected predetermined speed has been reached or is being exceeded.

It is an object of the present invention to provide vehicle speed indicating means of the class noted embodying electromagnetic means and movable control means having connection with an actuating member of vehicle power regulating means in which the electromagnetci means, when energized, effects frictional resistance of movement of the control means to increase the force required to move the actuator of the power regulating means in a power increasing direction when the vehicle reaches the selected predetermined speed.

A further object of the invention is to provide vehicle speed indicating means as last noted embodying mechanical means enabling movement of the actuating member of the vehicle power regulating means in a power decreasing direction to reduce the speed of the vehicle a predetermined extent below the selected predetermined speed for the vehicle at which frictional resistance to movement of the control means is released.

A further object is to provide vehicle speed indicating means for a vehicle embodying normally open motion controlled switch means adapted to be closed at a selected predetermined speed for the vehicle comprising electromagnetic means and control means operative to apply increased resistance to movement of an actuating member of vehicle power regulating means in a power increasing direction upon closing of the motion controlled switch means.

A further object is to provide vehicle speed indicating means as last noted in which the control means is operative to permit movement of the actuator of the power regulating means a predetermined extent in a power decreasing direction to effect opening the motion controlled switch means.

A further object is to provide vehicle speed indicating means as above noted associated with brake switch means in circuit with the motion controlled switch means to effect opening of the circuit upon application of the vehicle brakes.

The above and other objects and advantages of the invention will be apparent from the following description of certain preferred embodiments of the invention.

Now in order to acquaint those skilled in the art with the manner of constructing and operating vehicle speed indicating means of the present invention, there is described below certain preferred embodiments of the invention.

In the drawings:
FIGURE 1 is a diagrammatic view of the vehicle speed indicating means and typical electrical circuit therefor of the present invention for embodying the invention in an automative vehicle;
FIGURE 2 is an enlarged elevational view of the electromagnetic means and control means diagrammatically shown in FIGURE 1;
FIGURE 3 is a detail vertical sectional view of the electromagnetic means of FIGURE 2;
FIGURE 4 is a detail vertical sectional view taken on the line 4—4 of FIGURE 2, looking in the direction indicated by the arrows;
FIGURE 5 is a detail sectional view taken on the line 5—5 of FIGURE 2 looking in the direction indicated by the arrows;
FIGURE 6 is an end view of a modified form of control means of the invention; and
FIGURE 7 is a detail broken away view showing the manner in which the control means of FIGURE 6 is associated with electromagnetic means therefor.

Referring now to FIGURE 1, the vehicle speed indicating means of the present invention is shown in association with vehicle power regulating means indicated at 1, and speedometer motion controlled normally open switch means, shown at 2. The vehicle power regulating means 1 is conventional in the automotive art and comprises an actuating member 3, such as the usual accelerator pedal, mounted for pivotal movement by the foot of the vehicle operator and having connection with linkage, indicated at 4, extending to a carburetor for an engine for the vehicle in which the foregoing components are embodied. The accelerator pedal upon movement in a power increasing direction, counterclockwise as viewed in FIGURE 1, is effective to increase the power output and speed of the vehicle, and movement of the accelerator pedal in a power decreasing direction, clockwise as shown in FIGURE 1, lowers the power output and slows the speed of the vehicle. The speedometer motion controlled switch means 2 may be of any suitable construction and, for example, may be like that disclosed in Patent No. 2,701,035. The speedometer motion controlled switch means 2 is actuated by the speedometer cable upon movement of the vehicle and, as is known, includes means for manually selectively setting the device so that at a selected predetermined speed a switch blade 6 of the switch closes the normally open contacts 7 and 8 of the switch to complete a circuit through the switch.

In the typical circuit shown in FIGURE 1, a first ground connection 10 connects with a conventional storage battery 12, and an output lead 13 branches off to leads 14 and 29. The lead 14 may conveniently embody a conventional ignition switch 15, a circuit protecting fuse 16, a transmission switch 17 adapted to be closed when the transmission is shifted to drive position, contacts 18 and 19 of a normally closed relay switch means 20, contacts 21 and 22 of a normally open relay switch means 23, and leads 24 and 25 of solenoid 26 of electromagnetic means 27 of the present invention hereinafter described and then to ground as at 28. The lead 29 has a normally open brake switch means 30 connected thereon, which is adapted to be closed upon application of brake means 32 of the vehicle, energizing the solenoid 33 of the normally closed relay switch means 20 to ground 31. A lead 37 has connection with contact 21 of normally open relay switch means 23 and embodies the solenoid 38 of the latter and then connects with lead 14 extending to contact 7 of the motion controlled switch means 2. A lead 48 extends from lead 14 between brake switch means 30 and the solenoid 33 of normally closed relay switch means 20 and from which lead 48 branch leads 49 incorporating conventional stop lights 50 for the vehicle extend and then to ground at 51.

Upon closing of the ignition switch 16 and transmission switch 17 and depressing actuating member 3 of the power regulating means 1 movement is imparted to the vehicle. The operator of the vehicle may have previously set or may thereafter set the speed controlled normally opened switch means 2 at a predetermined selected speed desired for the vehicle. When such speed is attained contacts 6 and 7 of the switch close and solenoid 38 of the normally open relay switch means 23 is energized and which, in turn, effects energization of solenoid 26 of the electromagnetic means 27. In this regard, it will be observed that upon application of the brake pedal means 32 that brake switch means 30 will effect energization of the solenoid 33 to open the normally closed relay switch means 20 and thus deenergize the solenoid 38 of the normally open relay switch means 23 and also deenergize the solenoid 26.

As seen in FIGURE 1, the actuating member 3 is provided with connecting means 55 for connecting the latter to control means, indicated generally at 56, which includes lost motion connecting means provided by pin 58 carried by the actuating member 3 for relative movement in an elongated slot 59 formed at the lower end of a first member 60 in the form of a tube of the control means 56. The control means 56 further comprises a rod or second member 62 disposed in telescopic relation with the first or tube member 60 providing for relative movement of these two members of the control means with respect to each other. A coil spring 64 is anchored at one end to the rod 62 and at its other to the lower end of the tubular member 60 with each spring means serving to connect the rod and tubular member for conjoint movement with each other through the spring 64 and for relative movement with respect to each other by expansion and contraction of spring 64. The rod 62 as best seen in FIGURE 3 is adapted to project through an opening or bore 67 at one end of a plunger 68 of the electromagnetic means 27 for relative sliding movement with respect thereto.

The electromagnetic means 27 in addition to the aforementioned solenoid 26 and plunger 68 comprises frame means including an end frame member 70 at one end of solenoid 26 of magnetic material. A stop pin 72 extends through an opening in frame 70 for threaded engagement with the plunger 68 to retain the plunger 68 within the solenoid. The frame means of electromagnetic means 27 may further comprise a second end frame member 75 at the other end of solenoid 26. The end frame member 75 may be formed of magnetic or non-magnetic material and serves as will be described as abutment means for the rod 62 of control means 56.

It will be observed that the rod 62 as best seen in FIGURE 4 is flatted at the portion 77 thereof opposing the end frame member 75. A bracket 79 may be provided for mounting the electromagnetic means on a suitable portion of an automotive vehicle.

In the electromagnetic means 27 as above described, energization of solenoid 26 thereof draws the plunger 68 inwardly into attracted position. The rod 62 of the control means 56 preferably is provided with a flatted surface 77 which on energization of solenoid 26 is drawn into tight frictional engagement with the surface of the end frame member 75 to restrain relative movement of rod 62 with respect to the bore 67 of plunger 68. The rod when thus engaged with the end frame member 75 provides an air gap 73 between the frame member 70 and the adjacent end of the plunger 68 providing a strong magnetic field retaining the plunger in attracted position.

From the foregoing it will be seen that upon movement of the actuating member 3 in a power increasing direction from its normal position shown in FIGURE 1 that the lost motion connecting means will be taken up and the pin 58, will engage the bottom of the slot 59 moving the tubular member 60 and the rod 62 of control means 56 downwardly. The member 60 and rod 62 are caused to be moved jointly through the spring 64. Such movement of the control rod means 56 occurs upon continuing power increasing movement of the actuating member 3 until the speed motion control switch means 2 is closed which, as before noted, effects energization of the solenoid 26 of the electromagnetic means 27 and which when this occurs tightly frictionally engages the control rod 62 with the frame member 75 of electromagnetic means 27 to resist further relative movement of the rod 62 with respect to the eletromagnetic means. Further movement of the actuating member 3 in a power increasing direction will effect loading of coil spring 64 and impose increased resistance to movement of the actuating member of the power regulating means alerting the operator of the vehicle that he is at or is exceeding the predetermined preselected speed called for the the speedometer motion control switch means 2. After energization of the electromagnetic means 27 and release of the actuating member 3 by the operator sufficient to take up the lost motion provided by the pin 58 in slot 59 slows the vehicle in a predetermined amount less than the speed for which the speed control switch means 2 may be set, the latter switch opens to deenergize solenoid 26 of the electromagnetic means 27. Also, it will be observed that if the vehicle is caused to be braked by application of the brake pedal 32, brake switch means 30 will close thereby opening the normally closed relay switch means 20 and the circuit for the motion control switch means 2, which effects deenergization of the solenoid 26 of the electromagnetic means 27 and release of the control rod 62.

Referring now to FIGURES 6 and 7 there is shown a modified form of control means for association with electromagnetic means indicated generally at 80. In the arrangement of the latter figures, a control rod 82 is arranged in the same manner as rod 62 with the aforedescribed tubular member 60. The upper end of the rod 82 is pivotally connected at 84 to a lever 85 which as best seen in FIGURE 7 is connected to the adjacent end of plunger 88 of the electromagnetic means 80. Thus, upon energization of the solenoid 82 of the electromagnetic means 80, the plunger 88 in its attracted position frictionally engages the lever arm 85 with the end frame member 95 of the electromagnetic means 80 to frictionally resist turning movement of the lever. It is believed it will be clear that the electromagnetic means 80 and control means of FIGURES 6 and 7 are incorporated in the same manner in the circuit as above described providing the mode of operation above discussed.

The foregoing structures may be embodied with motion control switch means of any desired type and for example may be associated with a speedometer that embodies a warning light or buzzer energized when a selected predetermined speed is reached. In such arrangements, the normally opened relay switch 23 above described may be substituted for the light or buzzer of the speedometer last noted to effect energization of the solenoids of the electromagnetic means of the present invention. Also, it will be observed that the lost motion connection between the actuator member 3 and the control means 56 provides a mechanical substitute for a switch to break the solenoid circuits of the electromagnetic means 27 and 80. As previously discussed, the slot 59 is sufficiently long to effect reduction of gas input to the carburetor of the vehicle to slow the vehicle sufficiently to open the motion control switch means 2 to thereby deenergize the solenoids of the electromagnetic means of the invention and release freezing of the control means 56.

While there have been shown and described certain preferred embodiments of the invention, it will be understood that various modifications and rearrangements may be made therein without departing from the spirit and scope of the invention.

I claim:
1. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising electromagnetic means having a solenoid and a plunger therefor, movable control means between said plunger of said electromagnetic means and having connection with said actuating member for movement by the latter, means for energizing said solenoid of said electromagnetic means upon closing of said motion control switch means, stationary abutment means, said plunger upon energization of said solenoid frictionally engaging said control means with said abutment means restraining movement of said control means and said actuating member in a power increasing direction at said predetermined selected speed of the vehicle, and said control means including means operative upon engagement of said control means with said abutment means to increase the force required to continue to move said actuating member in a power increasing direction beyond predetermined selected speed of the vehicle.

2. The vehicle speed indicating means of claim 1 for use in a vehicle embodying brake means for braking the vehicle characterized by brake switch means in circuit with said motion controlled switch means for opening said circuit upon application of said brake means.

3. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising electromagnetic means having a solenoid and a plunger therefor, control means movable relative to said plunger of said electromagnetic means, lost motion connecting means connecting said control means with said actuating member, means for energizing said solenoid of said electromagnetic means upon closing of said motion control switch means at said predetermined selected vehicle speed, stationary abutment means, and said plunger upon energization of said solenoid frictionally engaging said control means with said abutment means restraining movement of said control means and said actuating member in a power increasing direction at said predetermined selected speed of the vehicle, and said control means including means operative upon engagement of said control means with said abutment means to increase the force required to continue to move said actuating member in a power increasing direction beyond said predetermined selective speed of the vehicle, and said lost motion connecting means providing for movement of said actuating member in a power decreasing direction for slowing the speed of the vehicle below said predetermined selected speed and thereby effect opening of said motion controlled switch means.

4. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising normally open relay switch means, electromagnetic means comprising a solenoid and a plunger movable upon energization of said solenoid, circuit means connecting said motion controlled switch means, said relay switch means and said solenoid to provide for closing of said relay switch means and energization of said solenoid upon closing of said motion controlled switch means, control means extending between said plunger and said actuating member of said vehicle power regulating means, connecting means for connecting said control means with and for movement by said actuating member of said vehicle power regulating means, said plunger upon energization of said solenoid frictionally restraining movement of said control means and said actuating member of said vehicle power regulating means in a power increasing direction at said predetermined speed of said vehicle, and said control means including means operative upon energization of said solenoid to increase the force required to continue to move said actuating member in a power increasing direction beyond said predetermined selective speed of the vehicle.

5. The vehicle speed indicating means of claim 4 for use in a vehicle embodying brake means for braking the same characterized by normally closed second relay switch means in said circuit means, and normally open brake switch means in said circuit adapted to be closed upon application of said brake means to open said second relay switch means and thereby open said circuit means.

6. The vehicle speed indicating means of claim 4 characterized by said electromagnetic means having a frame, and said control means comprising a lever connected to said plunger for frictionally engaging said frame means providing for frictionally restraining movement of said control means.

7. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising normally open relay switch means, electromagnetic means comprising a solenoid and a plunger movable upon energization of said solenoid, circuit means connecting said motion controlled switch means, said relay switch means and said solenoid to provide for closing of said relay switch means and energization of said solenoid upon closing of said motion controlled switch means at said predetermined selected speed of the vehicle, control rod means extending between said plunger and said actuating member of said vehicle power regulating means, connecting means for connecting said control rod means with and for movement by said actuating member of said vehicle power regulating means, said plunger upon energization of said solenoid frictionally restraining movement of said control rod means and said actuating member of said vehicle power regulating means in a power increasing direction, said control rod means including means operative upon energization of said solenoid to increase the force required to continue to move said actuating member in a power increasing direction beyond said predetermined selected speed of the vehicle, and lost motion means for said connecting means providing for movement of said actuating member in a power decreasing direction for slowing the speed of the vehicle below said predetermined selected speed, and thereby open said motion controlled switch means and said relay switch means and de-energize said solenoid to release said control means.

8. The speed control means of claim 7 characterized by said lost moiton connecting means comprising pin and slot means between said actuating member of said vehicle power regulating means and said control means.

9. For use in an automotive vehicle having vehicle power regulating means comprising an actuating member movable in power increasing and decreasing directions, and normally open moiton controlled switch means adapted to be closed at a predetermined selected speed of the vehicle, the combination of vehicle speed indicating means comprising normally open relay switch means, electromagnetic means comprising a solenoid and a plunger movable upon energization of said solenoid, circuit means connecting said motion controlled switch means, said relay switch means and said solenoid to provide for closing of said relay switch means and energization of said solenoid upon closing of said motion controlled switch means, control means extending between said plunger and said actuating member of said vehicle power regulating means, said control means comprising first and second members movable relative to each other, and spring means for normally connecting said first and second members for conjoint movement, connecting means for connecting said control means with and for movement by said actuating member of said vehicle power regulating means, and said plunger upon energization of said solenoid frcitionally restraining movement of one of said members of said control means and thereby restraint movement of said actuating member of said vehicle power control means in a power increasing direction beyond the position thereof at said predetermined selected speed of the vehicle, and said actuating member upon movement thereof in a power increasing direction beyond said last named position thereof effecting loading of said spring means of said control means to afford increased resistance to movement of said actuating member.

10. For use in an automotive vehicle having vehicle power regulating means comprising an actuating member movable in power increasing and decreasing directions, and normally open moiton controlled switch means adapted to be closed at a predetermined selected speed of the vehicle, the combination of vehicle speed indicating means comprising normally open relay switch means, electromagnetic means comprising a solenoid and a plunger movable upon energization of said solenoid, circuit means connecting said motion controlled switch means, said relay switch means and said solenoid to provide for closing of said relay switch means and energization of said solenoid upon closing of said motion controlled switch means, control means extending between said plunger and said actuating member of said vehicle power regulating means, said control means comprising first and second members movable relative to each other, and spring means for normally connecting said first and second members for conjoint movement, connecting means for connecting said control means with and for movement by said actuating member of said vehicle power regulating means, and said plunger upon energization of said solenoid frictionally restraining movement of one of said members of said control means and thereby restraining movement of said actuating member of said vehicle power regulating means in a power increasing direction beyond the position thereof at said predetermined speed of the vehicle, said actuating member upon movement thereof in a power increasing direction beyond said last named position thereof effecting loading of said spring means of said control means to afford increased resistance to movement of said actuating member, and lost motion connecting means for said connecting means providing for movement of said actuating member in a power decreasing direction for slowing the vehicle below said predetermined selected speed thereof and thereby open said motion controlled switch means and said relay switch means and de-energize said solenoid to release said control means.

11. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising nromally open relay switch means, electromagnetic means comprising a frame, a solenoid and a plunger movable upon energization of said solenoid, said plunger having an opening at one end thereof, circuit means connecting said motion controlled switch means, said relay switch means and said solenoid to provide for closing of said relay switch means and energization of said solenoid upon closing of said motion controlled switch means, control means extending between said plunger and said actuating member of said vehicle power regulating means, said control means comprising a member disposed for sliding movement in said opening of said plunger, and in which energization of said solenoid frictionally restrains movement of said member of said control means by biasing said member into frictional engagement with said frame of said electromagnetic means, connecting means for connecting said control means with and for movement by said actuating member of said vehicle power regulating means, said plunger upon energization of said solenoid frictionally restraining movement of said member of said control means and said actuating member of said vehicle power regulating means in a power increasing direction at said predetermined selected speed of the vehicle, and said control means including means operative upon engagement of said member of said control means with said frame of said electromagnetic means to increase the force required to continue to move said actuating member in a power increasing direction beyond said predetermined selected speed of the vehicle.

12. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising normally open relay switch means, electromagnetic means comprising a frame, a solenoid, and a plunger movable upon energization of said solenoid, said frame means comprising a frame member of magnetic material at one end thereof, said plunger having an opening at one end thereof, circuit means connecting said motion controlled switch means, said relay switch means and said solenoid to provide for closing of said relay switch means upon energization of said solenoid upon closing of said motion controlled switch means, control means extending between said plunger and said actuating member of said vehicle power regulating means, said control means having a member disposed for sliding movement in said opening of said plunger, said solenoid when energized frictionally restraining movement of said member of said control means by biasing said last named member into engagement with said frame means of said electromagnetic means, and said last named member when engaged with said frame means spacing the other end of said plunger away from said frame member to provide a magnetic air gap therebetween, connecting means for connecting said control means with and for movement by said actuating member of said vehicle power regulating means, and said plunger upon energization of said solenoid frictionally restraining movement of said member of said control means and said actuating member of said vehicle power regulating means in a power increasing direction at said predetermined selected speed of the vehicle, and said control means including means operative upon engagement of said member of said control means with said frame means of said electromagnetic means to increase the force required to continue to move said actuating member in a power increasing direction beyond said predetermined selected speed of the vehicle.

13. For use in an automotive vehicle having vehicle power regulating means comprising an actuating member movable in power increasing and decreasing directions, and normally open motion controlled switch means adapted to be closed at a predetermined selected speed of the vehicle, the combination of vehicle speed indicating means comprising normally open relay switch means, electromagnetic means comprising a frame, a solenoid and a plunger movable upon energization of said solenoid, circuit means connecting said motion controlled switch means, said relay switch means an said solenoid to provide for closing of said relay switch means and energization of said solenoid upon closing of said motion controlled switch means, control means extending between said plunger and said actuating member of said vehicle power regulating means, said control means comprising a movable member disposed for movement relative to said plunger, connecting means for connecting said control means with and for movement by said actuating member of said vehicle power regulating means, and said plunger upon energization of said solenoid frictionally restraining movement of said movable member of said control means by biasing said movable member into frictional engagement with said frame of said electromagnetic means restraining movement of said control means and said actuating member of said vehicle power regulating means in a power increasing direction at said predetermined selected speed of the vehicle, and said control means including means operative upon engagement of said movable member of said control means with said frame of said electromagnetic means to increase the force required to continue to move said actuating member in a power increasing direction beyond said predetermined selected speed of the vehicle.

References Cited by the Examiner

UNITED STATES PATENTS

| | | | |
|---|---|---|---|
| 2,171,401 | 8/1939 | McCoy | 180—82.1 |
| 2,214,567 | 9/1940 | Rosenthal | 180—82.1 |
| 2,265,524 | 12/1941 | Fruth | 180—82.1 X |
| 2,477,865 | 8/1949 | Du Charme. | |
| 2,630,138 | 3/1953 | Munson | 180—82.1 X |
| 2,658,591 | 11/1953 | Medlar et al. | 192—3 |
| 2,712,762 | 7/1955 | Pavlik et al. | |
| 2,990,825 | 7/1961 | Fuller et al. | 180—82.1 X |
| 3,058,555 | 10/1962 | Scofield et al. | 192—3 |

KENNETH H. BETTS, *Primary Examiner.*

BENJAMIN HERSH, *Examiner.*

E. E. PORTER, *Assistant Examiner.*